United States Patent [19]

Hager et al.

[11] 4,450,197

[45] May 22, 1984

[54] POLYTETRAFLUOROETHYLENE-IMPREGNATED BUNDLES OF SIZED GLASS FIBERS

[75] Inventors: Thomas P. Hager, Reynoldsburg; Larry W. Ferguson, Newark, both of Ohio

[73] Assignee: Owens-Corning Fiberglas Corporation, Toledo, Ohio

[21] Appl. No.: 368,074

[22] Filed: Apr. 14, 1982

[51] Int. Cl.³ .......................... D03D 3/00; B05D 3/05
[52] U.S. Cl. ..................................... 428/232; 427/387; 427/389.8; 428/245; 428/268; 428/365; 428/378; 428/391; 428/392
[58] Field of Search .................. 427/389.7, 389.8, 387, 427/389.9; 428/232, 245, 268, 365, 378, 391, 392

[56] References Cited

U.S. PATENT DOCUMENTS

| | | | |
|---|---|---|---|
| 2,712,509 | 7/1955 | Biefeld | 117/126 |
| 2,754,223 | 7/1956 | Caroselli | 117/54 |
| 4,065,417 | 12/1977 | Wong et al. | 260/17.4 CL |
| 4,104,434 | 8/1978 | Johnson | 427/389.8 X |
| 4,347,278 | 8/1982 | Flautt et al. | 428/288 |
| 4,370,376 | 1/1983 | Gangal et al. | 427/389.8 X |

Primary Examiner—Thurman K. Page
Attorney, Agent, or Firm—Ronald C. Hudgens; Greg Dziegielewski

[57] ABSTRACT

A method for impregnating a bundle of sized glass fibers with a composition comprising a polytetrafluoroethylene resin, a film-forming acrylic resin, a thickening agent and a polyhydrolyzable organosilane having nonhydrolyzable amine functionality is described. The impregnated bundles are especially suited for at least the warp of fabrics for filtering entrained particulates from gases such as flue gases from the combustion of hydrocarbon fuels such as coal.

5 Claims, No Drawings

POLYTETRAFLUOROETHYLENE-IMPREGNATED BUNDLES OF SIZED GLASS FIBERS

TECHNICAL FIELD

This invention relates to coated glass fiber fabrics, to methods and coatings used in making fiber bundles for such fabrics and to methods of using such fibers to filter entrained particulates from gases, especially hot flue gases from the combustion of hydrocarbon fuels such as coal. More particularly, this invention pertains to impregnating bubbles of sized glass fibers with compositions containing polytetrafluoroethylene resin.

BACKGROUND ART

Heretofore protective coatings containing polytetrafluoroethylene resin have usually been applied to glass fibers or glass fiber fabrics where the glass fibers have not been sized or have had any sizing removed (ordinarily by heating to about 1100° to 1300° F. after weaving into fabric) or have been pre-coated only with a glass-resin coupling agent such as an organosilane.

Thus, Fluatt, Wong and Walsh have disclosed in their application entitled POLYTETRAFLUOROETHYLENE FLUOROCARBON RESIN-CONTAINING COATING COMPOSITION FOR GLASS FIBERS, Ser. No. 200,675, filed Oct. 27, 1980, the direct coating of virgin glass fibers with compositions containing polytetrafluoroethylene resin which are similar to those employed in the present invention for impregnating bundles of sized glass fibers.

U.S. Pat. No. 3,838,082 to Sauer discloses the use of aqueous dispersions consisting essentially of film-forming polytetrafluoroethylene and a polyhydrolyzable organosilane (including amine-functional silanes) or organic titanate, zirconate or tin compound, together with an anionic or nonionic surfactant and, optionally, a water-repellent such as a fluorinated acrylate polymer, for coating desized glass fiber fabrics. Sauer discloses the alternative use of the same compositions for coating "sized glass fabric," i.e., "griege goods." Sauer does not suggest the inclusion in his coating compositions of a second film-forming polymer or resin, other than the fluorinated acrylic polymers as optional water-repellents, and he presents data which indicates that other properties are sacrificed when such fluorinated acrylic water repellents are included.

DISCLOSURE OF THE INVENTION

In one of its aspects, the invention comprises a method for impregnating a bundle of sized glass fibers which methods comprises (a) providing an essentially continuous bundle of glass fibers individually coated with a size comprising starch and a lubricant; (b) impregnating said bundle with an aqueous impregnating composition comprising (i) emulsifyied polytetrafluoroethylene resin, (ii) emulsified acrylic resin coalesceable to form a coherent film upon drying an aqueous dispersion thereof at temperatures as low as about 10° C., (iii) a thickening agent comprising base-solubilized polyacrylic acid, and (iv) a polyhydrolyzable organosilane having non-hydrolyzable amine functionality and/or hydrolysis and/or condensation products thereof; (c) drying the bundle containing said impregnating composition to deposit the non-volatile residue thereof in the interstices and on the outer surface of said bundle in contact with the sized glass fibers comprising said bundle.

In other aspects, the invention comprises the impregnated bubbles of glass fibers so produced and fabrics woven with such bundles as at least the warp thereof.

In still a further aspect, the invention is a method for removing entrained particulates from a gas, such as a hot flue gas from the combustion of coal or other fuel, by passing the gas through such a fabric to filter out particulates.

BEST MODE FOR CARRYING OUT THE INVENTION

The method of the invention for impregnating bundles of sized glass fibers can employ as input any suitable glass fibers sized with any suitable size compositions. Glass fibers of conventional commercial composition such as E-glass fibers are satisfactory for most purposes, although many special glasses known to the art may be employed where their higher cost is thought to be justified by their unique properties.

Conventional sizing compositions for glass fibers can be applied to the individual fibers, ordinarily as they are formed and before being gathered into bundles, by any of the techniques known to the art, such as roll coating, spraying, padding, etc. Suitable sizing compositions include aqueous compositions comprising starch and lubricant, such as an oil or wax, many of which are known to the glass fiber art. Especially suitable are such compositions further comprising an acrylic resin, particularly one having a minimum film-forming temperature not higher than about 10° C. The essentially continuous glass fibers to which the sizing composition has been applied will ordinarily then be gathered into one or more bundles, each bundle collected into a suitable package, such as by winding onto a sleeve or core, and then dried by heated air or other suitable means, although all or a portion of the drying can be accomplished before collecting if desired. Bundles with very low or even no twist are preferred.

The bundles of sized glass fibers can be impregnated with the impregnating compositions of the invention by any suitable method. One preferred method is by immersing the bundle in a body of the aqueous impregnating composition, as by pulling it around one or more rolls or bars under the surface of a body of the aqueous impregnating composition, to wet the bundle with the impregnating composition, and then drawing the bundle so wetted through a stripper die of suitably chosen dimensions to remove excess impregnating composition, which will ordinarily be recycled to the impregnating bath, and also to aid in working the impregnating composition throughout the bundle. While the amount of impregnating composition left in the bundle can vary widely, depending on both the concentrations of solids in the impregnating composition and on the subsequent processing and use contemplated for the impregnated bundle, an amount corresponding to about 3 to about 10 percent, and more preferably about 8 to about 10 percent, dried residue of the impregnating composition is ordinarily preferable, especially for use in fabrics for filtering particulates from gas such as flue gas from the combustion of coal or other fuels.

The concentrations of the various components in the aqueous impregnating compositions of the invention can vary widely, but preferably will be from about 3 to about 10 percent by weight of the emulsified polytetrafluoroethylene resin, from about 1 to about 5 percent by weight of the emulsified acrylic resin, from about 0.1 to about 1.0 percent by weight of the thickening agent and from about 0.1 to about 1.0 percent by weight of the organosilane. Total solids will preferably be from about 5 to about 25 percent by weight.

The emulsified polytetrafluoroethylene resin can be any suitable polytetrafluoroethylene resin which will not coalesce upon drying at ordinary ambient temperatures to form a coherent film. Preferably the polytetrafluoroethylene resin will also not coalesce to form a coherent film at the temperatures encountered in drying the aqueous composition in the bundle of glass fibers. Preferably the polytetrafluoroethylene resin will be emulsified as small particles from about 0.1 to about 1 micron, and more preferably from about 0.1 to 0.2 micron, in average diameter. Teflon (Reg.T.M. of DuPont) T-3338, a nonionic aqueous emulsion containing about 60 percent by weight polytetrafluoroethylene resin and about 6.5 percent by weight emulsifying agent, and Fluon (T.M. of ICI) 583 are particularly suitable materials.

The emulsified acrylic resin can be any suitable acrylic resin which will form, with the other non-volatile components of the aqueous composition, a cohesive film adherent to the sized glass fibers. Polymers of lower alkyl esters of acrylic, and less advantageously methacrylic, acids are preferred. It is preferred that the minimum film-forming temperature of the emulsified acrylic resin be lower than ordinary ambient temperatures, and more preferably not higher than about 5° C. A particularly suitable material is Rhoplex (Reg. T.M. of Rohm and Haas Co.) TR-520, which is a 50.5 percent solids anionic aqueous emulsion of an acrylic ester polymer having a minimum film formation temperature of about 5° C.

The thickening agent can be any suitable water soluble polymer, of which many are available and known in the art, preferably an acid functional acrylic polymer such as polyacrylic acid. A particularly suitable material is Acrysol (Reg.T.M. of Rohm and Haas Co.) ASE-108, a base-solubilized polyacrylic acid.

The organosilane can be any suitable polyhydrolyzable silane having non-hydrolyzable amine functionality. Among suitable materials which are readily available are:
$NH_2(CH_2)_3Si(OCH_2CH_3)_3$,
$NH_2(CH_2)_2NH(CH_2)_3Si(OCH_3)_3$, and
$CH_3OC(=O)(CH_2)_2NH(CH_2)_2NH(CH_2)_3Si(OCH_3)_3$.
While these organosilanes are ordinarily considered to act as resin-glass coupling agents at resin-glass interfaces, we have found that their inclusion in the impregnating compositions of the invention improves the properties and performance of the products even though the impregnating composition is applied to glass fibers already sized with an organic composition.

Additional conventional components may, if desired, also be included in the aqueous impregnating compositions for use with bundles of sized glass fibers according to the method of this invention. Among such optional components are fiber lubricants such as emulsifiable oils, of which Quaker (T.M. of Quaker Chemical Co.) 1618-335, an emulsifiable soybean oil, is a particularly suitable example, preferably at from about 0.1 to about 2 percent by weight, and defoamers.

EXAMPLE

A particularly suitable aqueous impregnating composition of the invention is given by the following formulation.

| Ingredient | Weight Percent As rec'd. | Solids |
|---|---|---|
| TE-3338 (66.5%) | 10.4 | 6.92 |
| TR-520 (50.5%) | 4.0 | 2.02 |
| $NH_2(CH_2)_3Si(OCH_2CH_3)_3$ (100%) | 0.8 | 0.80 |
| 1618-335 (100%) | 0.5 | 0.50 |
| $NH_4OH$ | 0.5 | — |
| ASE-108 (20%) | 2.4 | 0.48 |
| Nopco NDW defoamer (80%) | 0.1 | 0.08 |
| Water | 81.3 | — |
| Total | 100.0% | 10.8% |

The impregnated bundles of glass fibers of the invention can be used as both warp and fill, the latter preferably bulked or texturized for weaving into fabric or as only warp, substituting other fill. Other suitable fill for use in fabrics of the invention, especially those to be used for filtering particulates from gas such as flue gases from the combustion of coal or other fuels, can be produced from bundles of sized glass fibers, such as described hereinabove, by coating or impregnating them with an aqueous composition similar to that employed for the warp, but omitting the silane, during bulking or texturing of the fill bundle.

If desired, fabrics of the invention can be coated after weaving with additional polytetrafluoroethylene resin-containing compositions. This can be accomplished by conventional fabric coating techniques using an aqueous dispersion of the polytetrafluoroethylene resin, such as duPont TE-3338 diluted with water to about 30% solids by weight followed by drying. The total amount of all organic or volatile material in or on the final dried fabric can vary considerably, but will preferably be from about 8 to about 12, and most preferably about 10, percent by weight as determined by loss on ignition, of which the size will ordinarily contribute not more than about 0.5 percent.

INDUSTRIAL APPLICABILITY

Since desizing glass fibers ordinarily results in significant impairment of their physical properties, and since such impairment is usually more detrimental in the warp than in the fill of woven fabrics, the provision by the present invention of a method for impregnating bundles of conventionally sized glass fibers with polytetrafluoroethylene resin-containing compositions represents an important advance in the technology of providing glass fiber fabrics suitable for filtering particulates from gases, especially hot flue gases, and for other uses.

Numerous modifications and variations of the invention as described will be apparent to those skilled in the art, and such are contemplated as within the scope of the invention as claimed.

We claim:
1. A method for impregnating a bundle of sized glass fibers which comprises:
 (a) providing an essentially continuous bundle of glass fibers individually coated with a size comprising starch and a lubricant;
 (b) impregnating said bundle with an aqueous impregnating composition comprising:
   (i) emulsified polytetrafluoroethylene resin,

(ii) emulsified acrylic resin coalesceable to form a coherent film upon drying an aqueous dispersion thereof at temperatures as low as about 10° C.,
(iii) a thickening agent comprising base-solubilized polyacrylic acid, and
(iv) a polyhydrolyzable organosilane having non-hydrolyzable amine functionality and/or hydrolysis and/or condensation products thereof;
(c) drying the bundle containing said impregnating composition to deposit the non-volatile residue thereof in the interstices and on the outer surface of said bundle in contact with the sized glass fibers comprising said bundle.

2. A method according to claim 1 wherein said bundle of sized glass fibers is impregnated by immersion in a body of said aqueous impregnating composition to wet said bundle and then drawing the wetted bundle through a stripper die to remove excess aqueous impregnating composition from the bundle and to enhance penetration of said aqueous impregnating composition into the interstices of said bundle.

3. A method according to claim 1 wherein said size further comprises an acrylic resin, coalesceable to form a coherent film upon drying an aqueous dispersion thereof at temperature as low as about 10° C.

4. An impregnated bundle of glass fibers produced according to the method of claims 1, 2 or 3.

5. A woven glass fiber fabric comprising the impregnated bundles of glass fibers of claim 4 as at least the warp thereof.

* * * * *